Oct. 12, 1926. 1,602,523
C. W. DAKE
ROTOR FOR ELECTRIC MACHINES
Filed Nov. 14, 1925 2 Sheets-Sheet 1
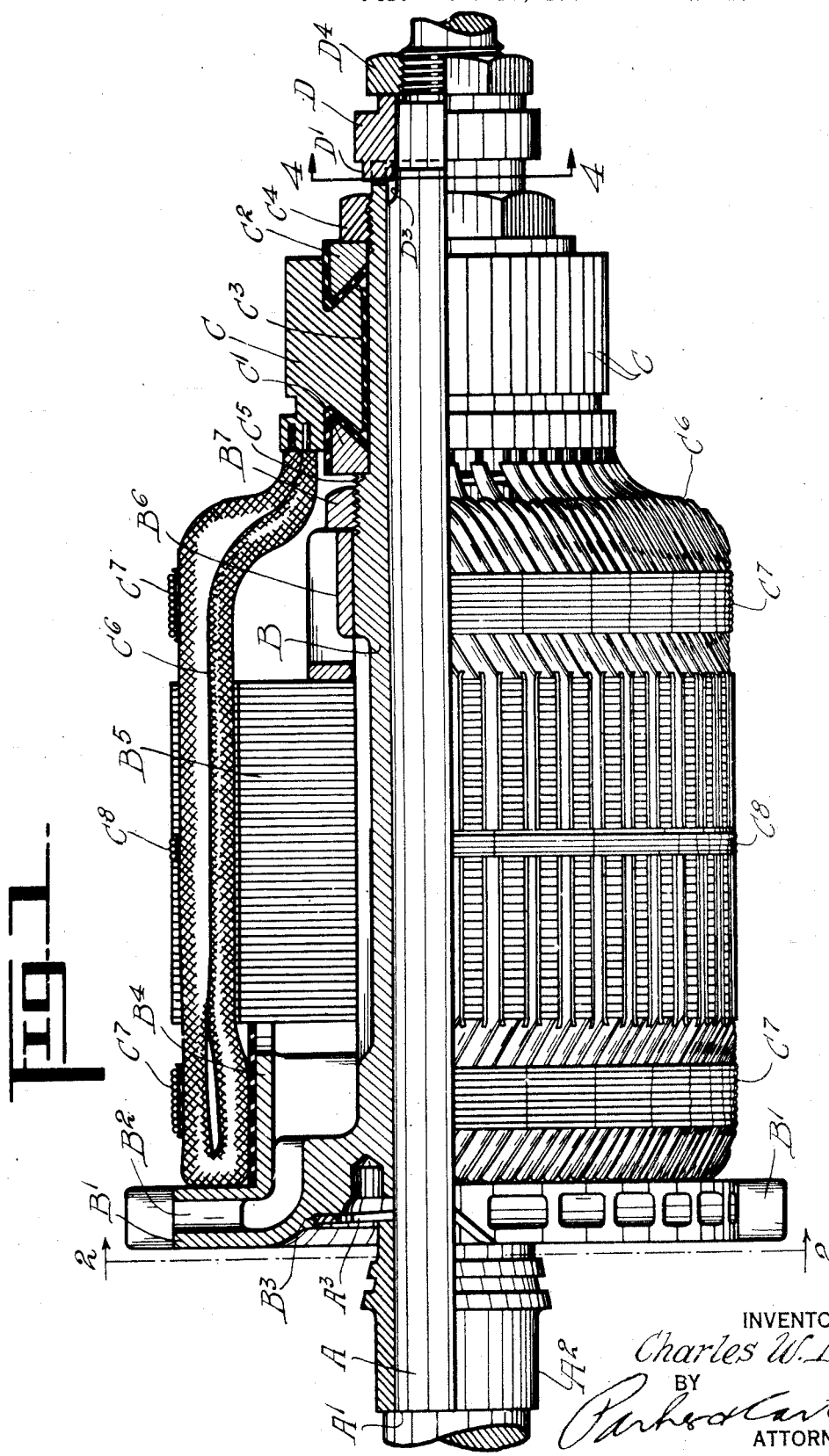
INVENTOR
Charles W. Dake
BY
Parker & Carter
ATTORNEY Oct. 12, 1926.
C. W. DAKE
ROTOR FOR ELECTRIC MACHINES
Filed Nov. 14, 1925
1,602,523
2 Sheets-Sheet 2
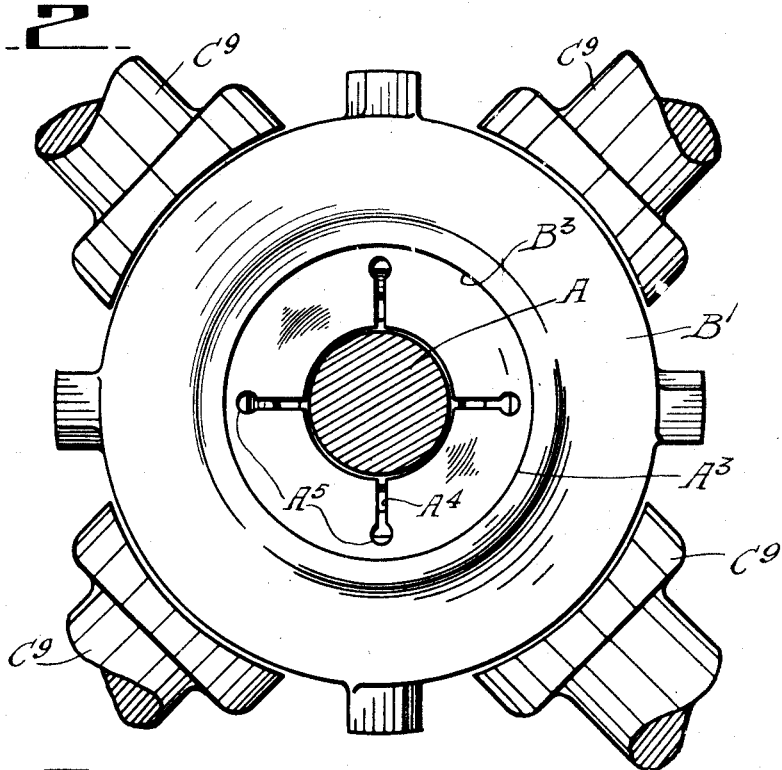
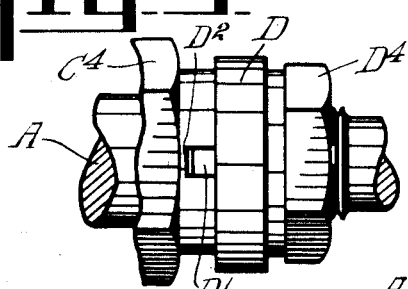
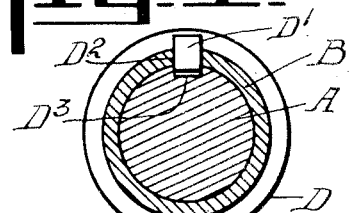
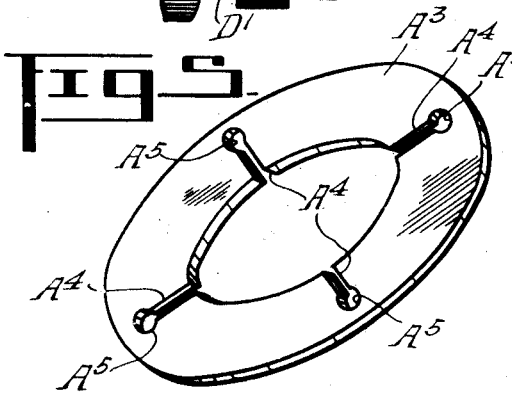
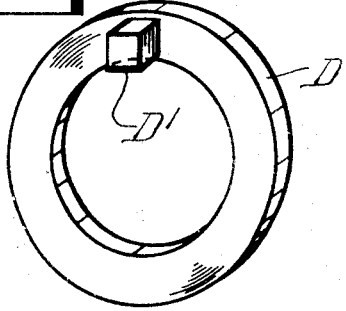
INVENTOR
Charles W. Dake
BY
ATTORNEY Patented Oct. 12, 1926.

1,602,523

UNITED STATES PATENT OFFICE.

CHARLES W. DAKE, OF CHICAGO, ILLINOIS.

ROTOR FOR ELECTRIC MACHINES.

Application filed November 14, 1925. Serial No. 68,979.

My invention relates to improvements in rotors for electric machines, and has for one object to provide a new and improved means for fastening or holding the rotor in position on the rotating shaft, whereby the rotor may be properly positioned without warping or straining of any of the parts. Experience shows that the absence of undue pressures or strains is absolutely essential in connection with those types of rotors wherein voltage variation must be reduced to a minimum, because if unbalanced stresses are set up in the rotor, spider, shaft or associated parts there is a tendency, under changes of temperature, speed, load and the like, for the parts to become very slightly displaced or thrown out of line. This results in great difficulties in connection with maintaining constant voltage regulation.

My invention is illustrated more or less diagrammatically in the accompanying drawings, wherein Figure 1 is a side elevation in part section showing the rotor;

Figure 2 is a section along the line 2—2 of Fig. 1;

Figure 3 is a detailed side elevation showing the locking means;

Figure 4 is a section along the line 4—4 of Fig. 1;

Figure 5 is a perspective view of a spring plate which forms a part of my invention;

Figure 6 is a perspective view of the locking sleeve.

Like parts are indicated by like characters throughout the specification and drawings.

A is the rotor shaft. It is shouldered at $A^1$, and carries a sleeve $A^2$ abutting the shoulder. Surrounding the shaft and resting against the end of this sleeve is a spring plate $A^3$. This spring plate has a plurality of radial slots $A^4$ terminating in enlarged holes $A^5$.

B is a spider comprising, in part, a tubular member extending along the shaft and terminating at the inner end in a perforate flange $B^1$, in which are a plurality of ventilating channels $B^2$. This flange is recessed at $B^3$ to engage the periphery of the spring plate $A^3$. Projecting inwardly from the flange along the axis of the member B is a cylindrical portion $B^4$, against which abut a series of laminations $B^5$, surrounding the member B and held against the member $B^4$ by a compression ring $B^6$ and nut $B^7$ threaded on the member B.

C are the commutator bars. They are held in place on the member B by the dovetailed sleeves $C^1$, $C^2$, being insulated from the sleeves and from the member B by insulating elements $C^3$. $C^4$ is a nut threaded on the reduced end of the member B, adapted to jam the rings $C^1$, $C^2$ together against the inner portions of the commutator bars, the collar $C^1$ resting against the shoulder $C^5$ on the member B. $C^6$ are coils terminating in the commutator bars and extending longitudinally across the ends of the laminated plates $B^5$, as indicated, being held in place by holding wrappings $C^7$, $C^8$. $C^9$ are pole pieces between which the rotor rotates.

It will be noted that the rotor assembly, comprising the spider B, the commutator bars, the laminated plates, coils, etc., is mounted as a unit and free to slide longitudinally of the shaft, being limited in its movement toward the left, as shown in Fig. 1, by the spring plate $A^3$.

D is a locking sleeve slidable on the reduced end of the shaft A. This locking sleeve engages the end of the spider B and is provided with a key or locking lug $D^1$ adapted to penetrate a slot $D^2$ in the end of the spider. This key or lug also travels in a keyway $D^3$ in the shaft. Thus this locking sleeve holds the shaft and the spider against relative rotation. $D^4$ is a locking nut threaded on the end of the shaft A. It engages the locking sleeve and forces the sleeve and the spider inwardly along the shaft, exerting a compression on the spring plate, thus providing a yielding holding means in cooperation with the spring plate to seat the spider and the rotating parts carried by it in proper position on the shaft. Changes in relative length of spider and shaft will thus be compensated for by increase or decrease of the distortion on the spring plate, and there will be no distortion and no undue strains set up in spider or shaft.

I claim:

1. In an electric rotor, a shaft, a spider slidable therealong, means for holding the shaft and spider against relative rotation, yielding means for resisting relative longitudinal movement in one direction and means interposed between the shaft and the spider for applying an initial load to said yielding means.

2. In an electric rotor, a shaft, a spider slidable therealong, means for holding the shaft and spider against relative rotation, yielding means for resisting relative longitudinal movement in one direction and means interposed between the shaft and the spider for applying initial load to said yielding means, the load applying means and the yielding means being located at opposite ends of the spider.

3. In an electric rotor, a shaft, a spider slidable therealong, means for holding the shaft and spider against relative rotation, yielding means for resisting relative longitudinal movement in one direction and means interposed between the shaft and the spider for applying an initial load to said yielding means, the load applying means being directly associated with the means for preventing relative rotation.

4. In an electric rotor, a shaft, a spider slidable thereon, a spring ring surrounding the shaft and engaging one end of the spider, means on the shaft opposed to the spider for preventing movement of the ring, a locking sleeve slidable on the shaft adjacent the opposed end of the spider, the shaft having a keyway, the spider being slotted, and a locking lug on the locking ring slidable in the keyway and the slot, a nut associated with the shaft adapted to force the locking ring against the spider to apply an initial load on the spring plate.

5. In an electric rotor, a shaft, a spider slidable thereon, a spring ring surrounding the shaft and engaging one end of the spider, means on the shaft opposed to the spider for preventing movement of the ring, a locking sleeve slidable on the shaft adjacent the opposed end of the spider, the shaft having a keyway, the spider being slotted, and a locking lug on the locking ring slidable in the keyway and the slot, a nut associated with the shaft adapted to force the locking ring against the spider to apply an initial load on the spring plate, the spring plate having a plurality of radial slots extending outwardly from the inner periphery thereof.

6. In an electric rotor, a shaft, a spider slidable thereon, a spring ring surrounding the shaft and engaging one end of the spider, means on the shaft opposed to the spider for preventing movement of the ring, a locking sleeve slidable on the shaft adjacent the opposed end of the spider, the shaft having a keyway, the spider being slotted, and a locking lug on the locking ring slidable in the keyway and the slot, a nut associated with the shaft adapted to force the locking ring against the spider to apply an initial load on the spring plate, the spring plate having a plurality of radial slots extending outwardly from the inner periphery thereof, said slots terminating in enlarged, curved-sided openings.

Signed at Chicago, county of Cook and State of Illinois, this 12th day of November 1925.

CHARLES W. DAKE.